(12) United States Patent
Baentsch et al.

(10) Patent No.: US 8,175,979 B2
(45) Date of Patent: May 8, 2012

(54) METHOD AND SYSTEM FOR ANONYMOUS ELECTRONIC TRANSACTIONS USING A MOBILE DEVICE

(75) Inventors: Michael Baentsch, Gross (CH);
Thorsten Kramp, Kilchberg (CH);
Michael P. Kuyper-Hammond, Kaitbrunn (CH)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 12/061,134

(22) Filed: Apr. 2, 2008

(65) Prior Publication Data

US 2009/0254485 A1 Oct. 8, 2009

(51) Int. Cl.
*G06Q 20/00* (2006.01)
(52) U.S. Cl. ............. 705/67; 705/76; 713/185; 380/30; 380/281; 235/379
(58) Field of Classification Search ............... 705/50–79
See application file for complete search history.

(56) References Cited

U.S. PATENT DOCUMENTS

| | | | |
|---|---|---|---|
| 6,330,544 B1 * | 12/2001 | Walker et al. ............. | 705/14.36 |
| 2002/0049681 A1 * | 4/2002 | Herreweghen .................. | 705/64 |
| 2004/0172539 A1 * | 9/2004 | Herrewegen et al. ......... | 713/176 |
| 2005/0177437 A1 * | 8/2005 | Ferrier ............................ | 705/26 |
| 2007/0022058 A1 * | 1/2007 | Labrou et al. .................. | 705/67 |
| 2010/0094727 A1 * | 4/2010 | Shapiro .......................... | 705/27 |

* cited by examiner

*Primary Examiner* — Jamie Kucab
(74) *Attorney, Agent, or Firm* — Cantor Colburn LLP; Daniel Morris

(57) ABSTRACT

A method for conducting transactions, includes: encoding concatenated transaction information at a cash point; sending the encoded concatenated transaction information from the cash point to a mobile device; receiving verification information from the mobile device formed in response to the encoded concatenated transaction information; confirming the received verification information; completing a transaction in the event of successfully confirming the received verification information.

18 Claims, 2 Drawing Sheets

METHOD AND SYSTEM FOR ANONYMOUS ELECTRONIC TRANSACTIONS USING A MOBILE DEVICE

BACKGROUND OF THE INVENTION

1. Field of the Invention

This invention relates generally to transaction handling employing mobile devices, and more particularly to a method, article, and system for conducting transactions in which a seller is only provided an "anonymized" digital receipt for authenticating a transaction that has been authorized by a transaction server that is trusted by both the buyer and seller.

2. Description of the Related Art

Electronic commerce has experienced tremendous growth over the years, and has replaced the use of cash in many transactions. The number of electronic transactions for everyday purchases is continuously growing, especially by means of credit cards and debit cards.

Mobile communication devices, such as cellular phones, have become a central communication tool for both business and personal use. Competitive pressures and multiple billing options have lowered the subscriber cost of operation of mobile communication devices. In many instances, the mobile or cellular phone has replaced the traditional landline phone as a person's primary communication device. Advanced mobile communication devices offer not only voice services, but also text messaging and Internet access. Mobile devices are increasingly also being utilized for electronic commerce, and to carryout purchase transactions.

SUMMARY OF THE INVENTION

Embodiments of the present invention include a method, article, and system for conducting transactions, the method includes: encoding concatenated transaction information at a cash point; sending the encoded concatenated transaction information from the cash point to a mobile device; receiving verification information from the mobile device formed in response to the encoded concatenated transaction information; confirming the received verification information; completing a transaction in the event of successfully confirming the received verification information An article comprising one or more computer-readable storage media containing instructions that when executed by a computer enables a method for conducting transactions, wherein the method further includes: encoding concatenated transaction information at a cash point; sending the encoded concatenated transaction information from the cash point to a mobile device; receiving verification information from the mobile device formed in response to the encoded concatenated transaction information; completing a transaction in the event of successfully confirming the received verification information.

A system for conducting transactions, the system includes: one or more transaction server devices in communication with one or more cash points and mobile devices through a network; the one or more transaction server devices, cash points, and mobile devices configured to execute electronic software; wherein the electronic software is resident on storage mediums in signal communication with the one or more transaction server devices, cash points, and mobile devices; wherein the electronic software comprises a series of instructions configured for: encoding concatenated transaction information at the one or more cash points; sending the encoded concatenated transaction information from the cash point to the one or more mobile devices; receiving verification information from the one or more mobile devices formed in response to the encoded concatenated transaction information; confirming the received verification information; completing a transaction in the event of successfully confirming the received verification information.

TECHNICAL EFFECTS

As a result of the summarized invention, a solution is technically achieved for a method, article, and system for conducting transactions in which a seller is only provided an "anonymized" digital receipt for authenticating a transaction that has been authorized by a transaction server that is trusted by both the buyer and seller.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The growth of electronic commerce has lead to issues of identity theft and privacy concerns. Commonly, with each transaction, a buyer leaves trace information by using the seller's infrastructure to authorize the transaction, which is potentially in conflict with the buyer's privacy interests.

Embodiments of the present invention include a method, article, and system for utilizing a buyer's mobile device for conducting transactions in which a seller is only provided an "anonymized" digital receipt for authenticating a transaction has been authorized by a transaction server that is trusted by both the buyer and seller.

Figure 1:
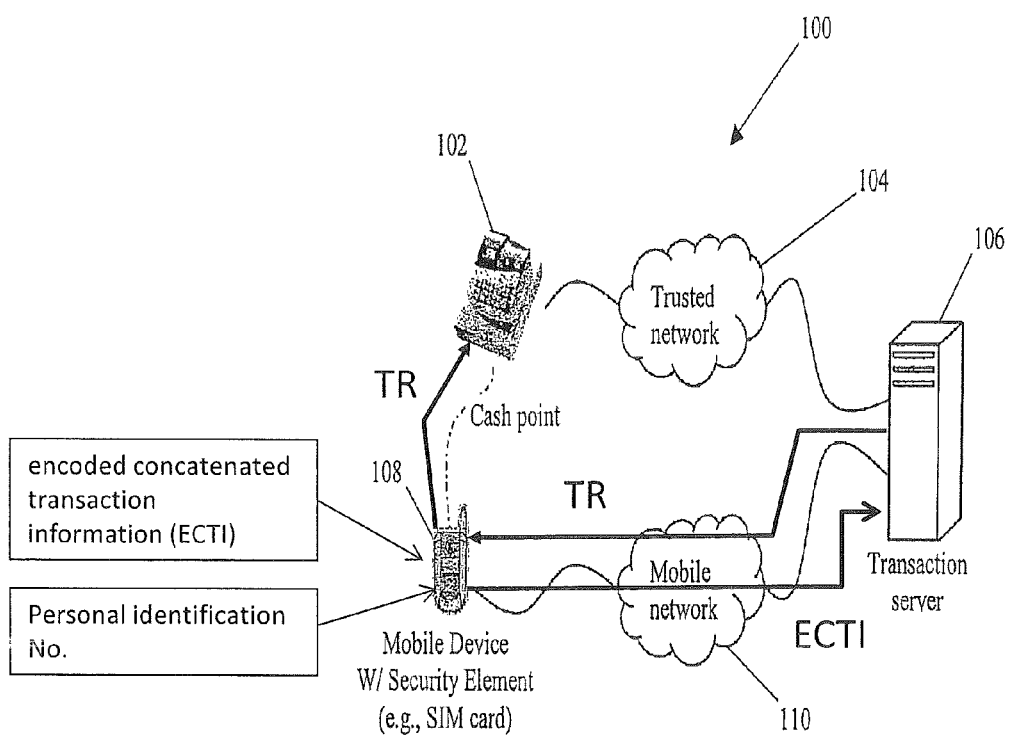
FIG. 1 is a block diagram illustrating an exemplary system that may be utilized to implement exemplary embodiments of the invention.

FIG. 1 is an exemplary system 100 for implementing embodiments of the invention. A transaction server 106 operated by a trusted third party (e.g., a bank, credit card issuer, etc.) is equipped with a private key (K_S) and matching certificate (C_S) signed by a trusted certificate authority (CA). The transaction server 106 issues symmetric one-time verification keys to cash points 102 and authorizes transactions over a trusted network 104. The transaction server 106 also has access to the certificates of all the buyers (C_B). A cash point 102 is run by a seller, and consists of a graphical display with sufficiently high resolution to display a 2-D barcode (encoding at least 32 bytes), and a standard 1-D barcode scanner (e.g., European Article Number (EAN), which is a superset of the original 12-digit universal product code (UPC), UPC, etc.). The cash point 102 is further connected in a trusted manner either directly (e.g., secure sockets layer (SSL) with client authentication), or indirectly (e.g., universal serial bus (USB) token) to the transaction server 106 via trusted network 104. Periodically (e.g., every day), the transaction server 106 issues, for each cash point 102, symmetric one-time verification keys, where each verification key being valid only for a short period of time (e.g., one minute).

A buyer's mobile device 108 configured with a graphical display of at least 95×95 pixels resolution, a still camera of a sufficiently high resolution to read 2-D barcodes (encoding at least 32 bytes) from the cash point's 102 display, and a PIN-protected security element (e.g., the SIM card, or a soft token, etc.). The security element, within the buyer's mobile device 108, is equipped with a matching certificate (C_S), a private key (K_B), and a matching certificate C_B signed by the transaction server 106. The mobile device 108 may further connect via a mobile network 110 (e.g., using short messaging service (SMS), general packet radio service (GPRS), etc.) to the transaction server 106.

An exemplary payment transaction initiated by a buyer with a seller includes the following steps:

1) The cash point (point of sale) 102 encodes the following concatenated transaction information (TI) in a 2-D barcode and displays it on the cash point's graphical screen:

TI: #(8)|T(8)|S(4)|A(8)|N(4)

whereby the symbol represented by '|' is a concatenation operator, # represents a number chosen by the seller that is unique for each transaction, T is the time of the transaction, S is a constant identifier uniquely identifying the seller and known to the transaction server, A is the amount to pay, and N is a nonce randomly chosen by the seller for each transaction. The number in parentheses is the respective length in bytes. It is noted that the byte lengths listed here solely for illustration purposes.

2) The mobile device 108 reads the 2-D barcode via its built-in camera, imaging sensor, or bar code reader, and decodes the information contained in the 2-D barcode.

3) The mobile device's 108 display outputs the amount to pay, and prompts the buyer for the personal identification number (PIN) of their security element, and finally passes the TI to the mobile device's 108 security element for digital signing to obtain a private key based on the transaction information K_B(TI).

4) The mobile device sends K_B(TI)|Hash(C_B) to the transaction server via the mobile network 110 (e.g., via SMS or GPRS).

5) The transaction server 106 identifies the buyer by Hash (C_B) and verifies the digital signature of K_B(TI) via the matching certificate C_B. In the event of successful verification of K_B(TI), and in the event the transaction can be approved, the transaction server 106 encrypts N (N is a nonce randomly chosen by the seller for each transaction) with the key V' derived from the verification key V, which is valid for the cash point of S (where S is a constant identifier uniquely identifying the seller and known to the transaction server) at the time T to get V'(N). For key derivation, all information of TI, and a standard key derivation scheme may be used. It is noted, V'(N) may be at most 33 bits if a standard EAN 1-D barcode is issued. Finally the transaction server 106 signs P|A|V'(N) to obtain a transaction receipt TR;

TR: K_S(P|A|V'(N))

where P is a plain text string identifying the seller S. TR is subsequently sent back to the buyer's mobile device 108 via the mobile network 110 (e.g., via SMS, etc.).

6) The buyer's mobile phone 108 verifies the signature of TR. In the event of a successful verification, the mobile phone 108 displays the amount A paid to the seller P, plus a verification barcode (e.g., 1-D EAN barcode, etc.) generated dynamically on the mobile phone 108 from V'(N). It is noted that, alternatively, the transaction server may generate the barcode, and send it as an image to the mobile device via, for instance, multimedia message service (MMS). Multimedia message service is a standard service for sending and receiving multimedia content on a mobile phone.

7) The cash point scans the verification barcode from the buyer's mobile phone 108 screen, calculates V' itself, and verifies N by decrypting V'(N) to successfully complete the transaction.

It is noted that duplicates of a transaction request TR are identified by the transaction server 106 (by comparing # in the TI), and may be answered by a copy of the original receipt. Furthermore, the embedded time stamp T within TI allows the transaction server 106 to reject delayed transaction authorization requests.

There are many benefits of the exemplary approach of the embodiment of the invention outlined above. The buyer is anonymous and pays the costs (e.g., for the network communication) to the transaction server for this privilege. The seller no longer requires the infrastructure for online transaction authorization. The transaction verification solution will run on all mobile phones and portable devices configured for communication that have a still camera and the Java run-time platform. Finally, the majority of existing cash points already support the solution proposed by embodiments of the invention (i.e., high-resolution graphical displays and 1-D barcode scanners).

In a second embodiment of the invention, the use of near field communication (NFC) configured devices, allows for a slight modification of the first exemplary embodiment of FIG. 1.

Near Field Communication or NFC, is a short-range high frequency wireless communication technology, which enables the exchange of data between devices over about a decimeter (one-tenth of a meter) distance. The NFC technology is an extension of the ISO 14443 proximity-card standard (contactless card, RFID) that combines the interface of a smartcard and a reader into a single device. An NFC device is configured to communicate with both existing ISO 14443 smartcards and readers, as well as with other NFC devices, and is thereby compatible with existing contact less infrastructure already in use for public transportation and payment. NFC is primarily aimed at usage in mobile phones.

With a NFC configured mobile device or phone, the mobile device or phone communicates wirelessly with a cash point (point of purchase), and a still camera is not required in the mobile device or phone. Unlike the first embodiment of the invention, the transaction information TI is no longer is displayed on the screen of the cash point, but may be read by the mobile device from the cash point wirelessly. In addition, it is then possible to wirelessly transfer V'(N) to the cash point by the mobile device. In additional embodiments, Bluetooth, or infrared technologies may be utilized in transferring information between mobile devices and the cash point (point of sale).

In additional embodiments of the invention, the whole payment transaction may alternatively be secured by means of public key infrastructure (PKI). In cryptography, PKI is an arrangement that binds public keys with respective user identities by means of a certificate authority (CA), or trusted third party (TTP). The user identity must be unique for each CA. The binding is established through the registration and issuance process, which, depending on the level of assurance the binding has, may be carried out by software at a CA, or under human supervision. The PKI role that assures this binding is called the registration authority (RA). For each user, the user identity, the public key, their binding, validity conditions and other attributes are made unforgeable in public key certificates issued by the CA.

In embodiments of the invention utilizing PKI, the cash point is equipped with a private key K_C and a matching certificate C_C signed by the transaction server. Furthermore, the transaction server knows all certificates C_C. A PKI payment transaction consists of the following steps, and referring to FIG. 1, according to embodiments of the invention.

1) The cash point 102 encodes the following concatenated transaction information (TI), and digitally signs TI to get K_C(TI), represented by:

TI: #(8)|A(8)

2) The mobile device 108 reads K_C(TI)|Hash(C_C) from the cash point 102 wirelessly.

3) The mobile device 108 displays the amount to pay, prompts the buyer for the PIN of their mobile device's 108 security element, and then passes K_C(TI)|Hash(C_C) to the security element for digital signing to obtain K_B(K_C(TI)|Hash(CC)).

4) The mobile device 108 sends K_B(K_C(TI)|Hash(C_C)|Hash(C_B) to the transaction server 106 via the mobile network 110 (e.g., via SMS, GPRS, etc.).

5) The transaction server identifies the buyer by Hash (C_B), and the seller by Hash(C_C), and verifies the two digital signatures. In the event the transaction is approved, the transaction server digitally signs P # A to obtain a transaction receipt

TR: K_S(P|#|A)

whereby P again is a plain text identifier of the seller S. It then sends TR back to the buyer's mobile device 108 via the mobile network (e.g., via SMS, GPRS, etc.).

6) The buyer's mobile device 108 verifies the signature of TR, and if successful displays the amount paid to the seller P.

7) The buyer transfers K_S(P|#|A) to the cash point wirelessly, and in response, the cash point 102 verifies the signature of TR to successfully complete the transaction.

Embodiments of the invention that utilize public key infrastructure (PKI), provide an additional advantage that the transaction server 106 is no longer required to issue verification keys in short intervals, and the seller has a receipt, which cannot be repudiated by the transaction server 106.

Figure 2:
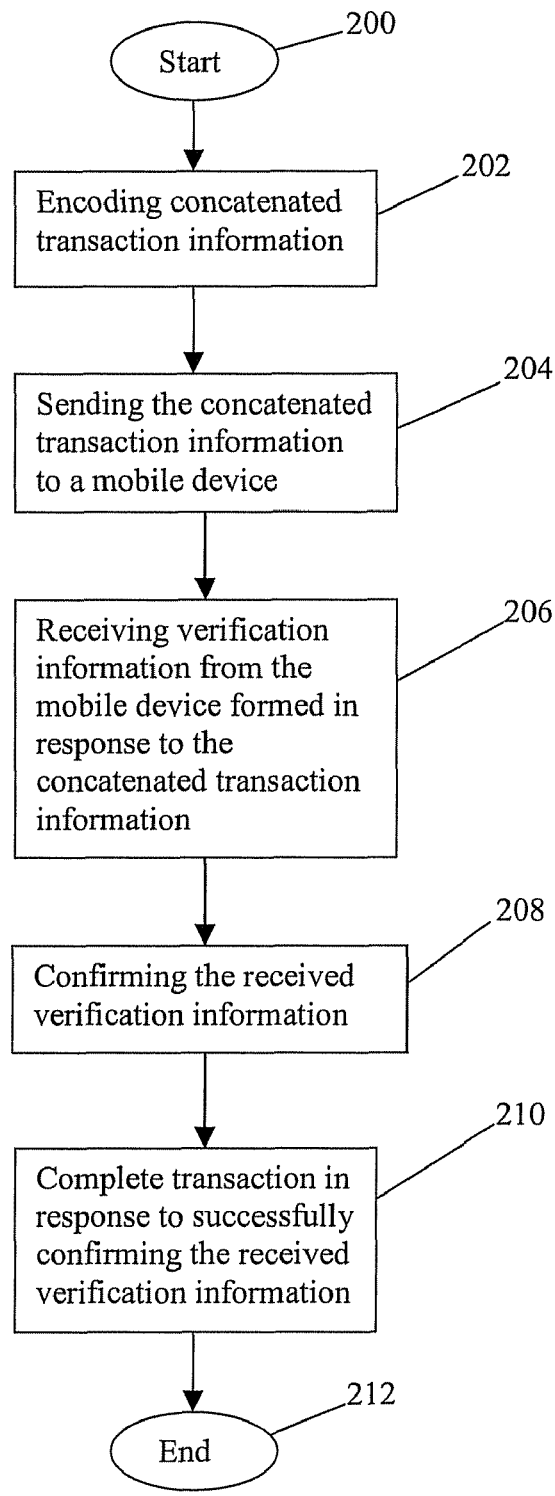
FIG. 2 is a flowchart for implementing a method for conducting transactions in which a seller is only provided an "anonymized" digital receipt for authenticating a transaction that has been authorized by a transaction server that is trusted by both the buyer and seller.

FIG. 2 is a flowchart of a transaction process according to embodiments of the invention. The process starts (block 200) by encoding concatenated transaction information (block 202) at a cash point (point of purchase) terminal, and providing a mobile device with the concatenated transaction information (block 204). The cash point receives verification information from the mobile device formed in response to the concatenated transaction information including date and time of the transaction (block 206). The cash point confirms the received verification information (block 208), and completes the transaction in response to successfully confirming the received verification information (block 210), and the process ends (block 212).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for conducting transactions, the method comprising:

receiving at a mobile device encoded concatenated transaction information at a from a cash point;

receiving at the mobile device a personal identification number;

after receiving the personal identification number, providing the encoded concatenated transaction information to a transaction server;

receiving at the mobile device a transaction receipt from the transaction server; and providing the transaction receipt from the mobile device to the cash point;

wherein the mobile device in response to receiving the encoded concatenated transaction information performs the following:

displays the amount to pay for carrying out the transaction;

prompts a buyer to enter a personal identification number (PIN) of the mobile device's security element;

supplies the encoded concatenated transaction information to a security element in response to the PIN entry;

wherein the security element digitally signs the encoded concatenated transaction information to obtain a private key; and wherein the private key is concatenated with a hash of a matching certificate, and is sent to the transaction server via a mobile network.

2. The method of claim 1, wherein the encoded concatenated transaction information comprises:

a number chosen by a seller that is unique for the transaction;

a recorded time for the transaction;

a constant identifier of a seller that is known to a transaction server;

a payment amount of the transaction; and a nonce randomly chosen by the seller for the transaction.

3. The method of claim 1, wherein receiving the encoded concatenated transaction information further comprises:

reading a barcode on the cash point's graphical screen with the mobile device's built in camera, imaging sensor, or barcode reader.

4. The method of claim 1, wherein the encoded concatenated transaction information is received wirelessly from the cash point.

5. The method of claim 4, wherein the mobile devices are configured with near field communication (NFC) technology.

6. The method of claim 1, wherein the transaction server in response to receiving the private key concatenated with a hash of a matching certificate performs the following:

identifies the buyer from the hash of the matching certificate;

verifies private key via the matching certificate;

wherein in response to successfully verifying the matching certificate, the transaction server encrypts the nonce with a verification key that is valid for the constant identifier at the time of the transaction; and wherein the transaction server generates the transaction receipt.

7. The method of claim 6, wherein providing the transaction receipt to the cash point includes causing the mobile device to perform the following:

verifies the transaction receipt;

displays the payment amount of the transaction;

generates a verification barcode based on the verified transaction receipt;

displays the verification barcode;

wherein the cash point scans the displayed verification barcode to obtain the verification key to complete the transaction.

8. The method of claim 1, wherein public key infrastructure (PKI) is utilized to secure the transaction.

9. The method of claim 1, wherein the mobile network utilizes at least one of short messaging service (SMS), and general packet radio service (GPRS).

10. An article comprising one or more computer-readable storage media containing instructions that when executed by a computer enables a method for conducting transactions, wherein the method further comprises:

receiving at a mobile device encoded concatenated transaction information from a cash point;

receiving at the mobile device a personal identification number;

after receiving the personal identification number, providing the encoded concatenated transaction information to a transaction server;

receiving at the mobile device a transaction receipt from the transaction server; and providing the transaction receipt from the mobile device to the cash point;

wherein the mobile device in response to receiving the encoded concatenated transaction information performs the following:

displays the amount to pay for carrying out the transaction;

prompts a buyer to enter a personal identification number (PIN) of the mobile device's security element;

supplies the encoded concatenated transaction information to the security element in response to the PIN entry;

wherein the security element digitally signs the encoded concatenated transaction information to obtain a private key; and wherein the private key is concatenated with a hash of a matching certificate, and is sent to the transaction server via a mobile network.

11. The article of claim 10, wherein the encoded concatenated transaction information comprises:

a number chosen by a seller that is unique for the transaction;

a recorded time for the transaction;

a constant identifier of a seller that is known to a transaction server;

a payment amount of the transaction; and a nonce randomly chosen by the seller for the transaction.

12. The article of claim 10, wherein receiving the encoded concatenated transaction information further comprises:

reading a barcode on the cash point's graphical screen with the mobile device's built in camera, imaging sensor, or barcode reader.

13. The article of claim 10, wherein the encoded concatenated transaction information is transferred wirelessly from the cash point to the mobile device.

14. The article of claim 13, wherein the mobile devices are configured with near field communication (NFC) technology.

15. The article of claim 10, wherein the transaction server in response to receiving the private key concatenated with a hash of a matching certificate performs the following:

identifies the buyer from the hash of the matching certificate;

verifies private key via the matching certificate;

wherein in response to successfully verifying the matching certificate, the transaction server encrypts the nonce with a verification key that is valid for the constant identifier at the time of the transaction; and wherein the transaction server generates the transaction receipt.

16. The article of claim 15, wherein providing the transaction receipt to the cash point includes causing the mobile device to perform the following:

verifies the transaction receipt;

displays the payment amount of the transaction;

generates a verification barcode based on the verified transaction receipt;

displays the verification barcode;

wherein the cash point scans the displayed verification barcode to obtain the verification key to complete the transaction.

17. The article of claim 10, wherein public key infrastructure (PKI) is utilized to secure the transaction.

18. The article of claim 10, wherein the mobile network utilizes at least one of short messaging service (SMS), and general packet radio service (GPRS).

* * * * *